(12) United States Patent
Sato

(10) Patent No.: US 9,244,250 B2
(45) Date of Patent: Jan. 26, 2016

(54) OPTICAL APPARATUS

(75) Inventor: Shigeki Sato, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 13/327,918

(22) Filed: Dec. 16, 2011

(65) Prior Publication Data

US 2012/0154616 A1 Jun. 21, 2012

(30) Foreign Application Priority Data

Dec. 20, 2010 (JP) ................................. 2010-282538

(51) Int. Cl.
*H04N 5/232* (2006.01)
*G03B 13/00* (2006.01)
*G02B 7/38* (2006.01)

(52) U.S. Cl.
CPC ............. *G02B 7/38* (2013.01); *H04N 5/23209* (2013.01); *H04N 5/23212* (2013.01); *H04N 5/23245* (2013.01)

(58) Field of Classification Search
CPC .................................................. H04N 5/23212
USPC ........................................ 348/345, 349, 220.1
See application file for complete search history.

(56) References Cited

U.S. PATENT DOCUMENTS 6,222,588 B1* 4/2001 Yamazaki et al. ............. 348/355
7,773,873 B2* 8/2010 Ishii ............................... 396/104
7,889,268 B2* 2/2011 Terada .......................... 348/345
2005/0041136 A1* 2/2005 Miyata et al. ................. 348/345
2005/0253953 A1* 11/2005 Ono .............................. 348/345
2008/0030594 A1 2/2008 Terada
2008/0049117 A1 2/2008 Watanabe
2008/0068490 A1 3/2008 Ueda et al.
2009/0059023 A1* 3/2009 Sasaki ........................ 348/222.1
2009/0097133 A1 4/2009 Terashima

FOREIGN PATENT DOCUMENTS

CN 1627796 A 6/2005
CN 1847903 A 10/2006

(Continued)

OTHER PUBLICATIONS

Notification of the First Office Action for corresponding CN 201110418065.4, dated Dec. 31, 2013. English translation provided.

(Continued)

*Primary Examiner* — Anthony J Daniels
(74) *Attorney, Agent, or Firm* — Rossi, Kimms & McDowell LLP

(57) ABSTRACT

An optical apparatus includes a focus lens that constitutes an image-pickup optical system configured to form an optical image of an object, a driver configured to drive the focus lens in an optical axis direction of the image-pickup optical system in focusing, and a controller configured to store a position of the focus lens in a memory which is set in accordance with an operation of a setter, and to control the driver in accordance with a manipulation of a manipulator so as to move the focus lens to the position stored in the memory, wherein the controller controls the driver so that a driving speed at which the focus lens is moved to the position stored in the memory when a mode of taking the object is a still image-pickup mode is higher than that in a motion image-pickup mode.

15 Claims, 4 Drawing Sheets

(56) References Cited

FOREIGN PATENT DOCUMENTS

| | | | |
|---|---|---|---|
| CN | 101075073 A | 11/2007 |
| CN | 101119436 A | 2/2008 |
| JP | 61-272726 A | 12/1986 |
| JP | 02-4088 A | 1/1990 |
| JP | 2702968 B | 1/1998 |
| JP | 2000-231130 A | 8/2000 |
| JP | 2000305008 A | 11/2000 |
| JP | 2001086382 A | 3/2001 |
| JP | 2004-023747 A | 1/2004 |
| JP | 2004-085671 A | 3/2004 |
| JP | 2007-065332 A | 3/2007 |
| JP | 2007-108393 A | 4/2007 |
| JP | 2008040008 A | 2/2008 |
| JP | 2009-098168 A | 5/2009 |
| JP | 2010199644 A | 9/2010 |

OTHER PUBLICATIONS

Japanese Office Action for corresponding JP2010-282538, dated Aug. 12, 2014.

Japanese Office Action cited in Japanese counterpart application No. JP2010282538, dated Feb. 10, 2015.

* cited by examiner

OPTICAL APPARATUS

BACKGROUND OF THE INVENTION

1. Field of the Invention

The present invention relates to an optical apparatus, such as a lens barrel and an image-pickup apparatus integrated with a lens barrel.

2. Description of the Related Art

Japanese Patent Laid-Open No. 2000-305008 discloses a lens barrel that has a focus preset function configured to previously store a position of a focus lens to be focused for a predetermined object distance, and to move a focus lens to the stored position. Japanese Patent No. 2,702,968 discloses a video camera configured to gradually transfer to a defocus state in response to a manipulation of a start switch (focus-out) and to transfer to an in-focus state in response to a second manipulation of the start switch.

The prior art cannot set a separate focus preset function in accordance with an image-pickup condition, such as an image-pickup mode including a still image-pickup and a motion image-pickup, a focal length, a presence or absence of an attachment of an extender, and a diaphragm set value. For example, although it is demanded to quickly move the focus lens to a preset position in the still image pickup and to change focusing at a stable speed in the motion image pickup, these demands are not met.

SUMMARY OF THE INVENTION

The present invention provides an optical apparatus that can realize a focus preset function that is different for each image-pickup condition.

An optical apparatus according to the present invention includes a focus lens that constitutes an image-pickup optical system configured to form an optical image of an object, a driver configured to drive the focus lens in an optical axis direction of the image-pickup optical system in focusing, and a controller configured to store a position of the focus lens in a memory which is set in accordance with an operation of a setter, and to control the driver in accordance with a manipulation of a manipulator so as to move the focus lens to the position stored in the memory, wherein the controller controls the driver so that a driving speed at which the focus lens is moved to the position stored in the memory when a mode of taking the object is a still image-pickup mode is higher than that in a motion image-pickup mode. Further features of the present invention will become apparent from the following description of exemplary embodiments with reference to the attached drawings.

DESCRIPTION OF THE EMBODIMENTS

Figure 1:
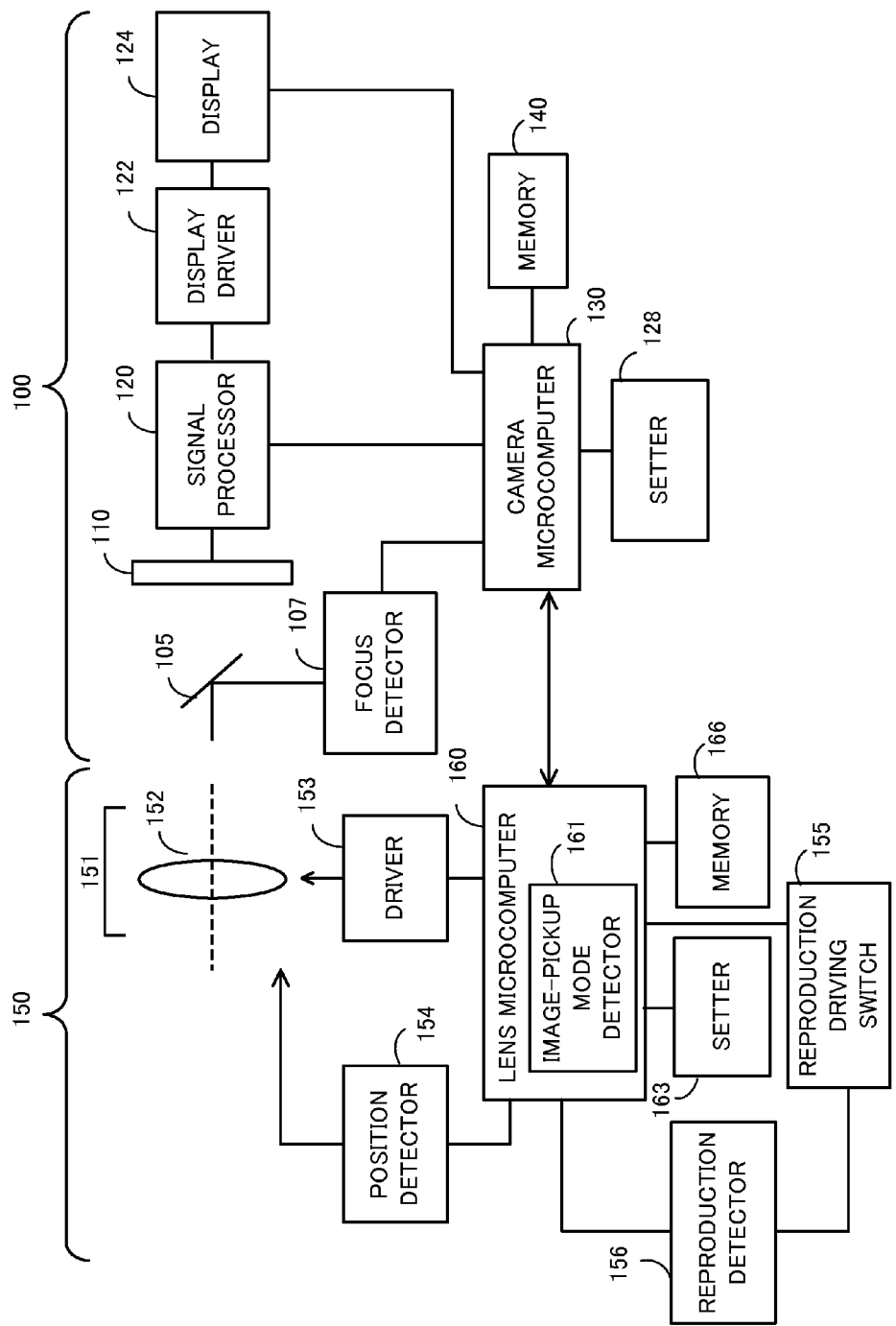
FIG. 1 is a block diagram of an image-pickup apparatus of this embodiment.

FIG. 1 is a block diagram of a structure of an image-pickup apparatus of this embodiment, and a broken line represents an optical axis. The image-pickup apparatus is a lens exchangeable type digital single-lens reflex camera but a type of the image-pickup apparatus is not limited and may include a digital video camera or the like. The image-pickup apparatus has an autofocus ("AF") function of a contrast method configured to find an in-focus direction in which an in-focus position (that provides a contrast peak position) is located by performing wobbling of an image-pickup optical system in an optical axis direction.

The image-pickup apparatus includes a camera body 100 and a lens barrel (exchange lens or lens unit) 150 exchangeably attached to the camera body 100, and thus the lens barrel 150 is configured replaceable. A mechanical attachment and detachment between the body 100 and the lens barrel 150 is achieved through a mount (not illustrated) of each of the body 100 and the lens barrel 150. An electric connection and disconnection between the body 100 and the lens barrel 150 is achieved through a connector (not illustrated) of each of the body 100 and the lens barrel 150.

The body 100 includes a sub-mirror 105, a focus detector 107, an image-pickup element 110, a signal processor 120, a display 124, a setter 128, a camera microcomputer (controller) 130, a memory 140, and another component.

The sub-mirror 105 is arranged with a main mirror (not illustrated) on the optical axis and configured so that it can be inserted into and retracted from an optical path. FIG. 1 illustrates a non-image-pickup state. The main mirror in this state reflects part of an incident light flux to an optical viewfinder (not illustrated), and transmits the remaining light to the sub-mirror 105, and the sub-mirror 105 reflects the incident light flux to the focus detector 107. At the image-pickup time, the main mirror and the sub-mirror 105 are retreated from the optical path so as to introduce the incident light flux to the image-pickup element 110.

The focus detector 107 receives a light flux at its internal detector configured to perform a photoelectric conversion for the light flux reflected by the sub-mirror 105. A defocus amount is found by calculating an output of this detector and by using a phase difference method. The camera microcomputer 130 evaluates a calculation result, and commands the lens microcomputer 160 to move the focus lens 152 by a predetermined amount.

The image-pickup element 110 converts an optical image formed by an image-pickup optical system into image data as an electric signal, and includes for example, a CCD sensor or a CMOS sensor. The image data from the image-pickup element 110 is converted into a digital signal by an AGC/AD circuit (not illustrated) and input into the signal processor 120.

The signal processor 120 is connected to the image-pickup element 110 and the camera microcomputer 130, and performs filtering, color conversions and gamma processing, and compression processing for digital image data, and sends the resultant data to the camera microcomputer 130. The image data processed as an image used for display by the signal processor 120 is sent to the display driver 122, and displayed as an image on the display 124 that is configured as an electronic viewfinder on a back surface of the body 100.

The setter 128 includes a mode dial and various types of operational units, and is configured to set an image-pickup mode, such as a still image-pickup mode and a motion image-pickup mode.

The camera microcomputer 130 is a microcomputer (CPU or processor) connected to the image-pickup element 110, the signal processor 120, and the setter 128, and the lens microcomputer 160 in the lens barrel 150 through the connectors (not illustrated).

The memory 140 stores various types of information.

The lens barrel 150 includes an image-pickup optical system 151, a driver 153, a position detector 154, a reproduction driving switch 155, a reproduction detector 156, a lens microcomputer 160, a setter 163, and a memory 166.

The image-pickup optical system 151 forms an optical image of an object, condenses the light onto the image-pickup element 110, and includes a plurality of lenses, such as a zoom lens (not illustrated) that is moved in the optical-axis direction at the magnification-varying time and a focus lens 152 that is moved in the optical-axis direction in the focusing time. The driver 153 moves the focus lens 152 in the optical-axis direction, includes an ultrasonic motor, a DC motor, or a stepping motor, and is controlled by the lens microcomputer 160.

The position detector 154 detects a position on the optical axis of the focus lens 152, and includes an encoder or a magnetic detector. For example, an output key of the driver 153 is configured rotatable around the optical axis. A position of the focus lens 152 can be detected based on a pulse that is generated with an rotating amount of an encoder as the output key rotates, and a brush that runs on a gray code pattern The reproduction driving switch 155 is a driving commander configured to issue a command of driving the focus lens to the position set by the setter 163, and to set a predetermined driving amount. As described later, the reproduction driving switch 155 may be provided to the lens barrel 150, or may be provided to the camera body 100 and the lens microcomputer 160 may obtain that command. The reproduction detector 156 detects a fact of manipulation of the reproduction driving switch 155 and a manipulated amount in that case.

The lens microcomputer 160 is a controller electrically connected to the camera microcomputer 130, and configured to exchange information necessary for image-pickup operations, and includes a microcomputer (CPU or processor). A connection between the lens microcomputer 160 and the camera microcomputer 130 provides bidirectional data communications.

The lens microcomputer 160 includes an image-pickup mode detector 161. The image-pickup mode detector 161 determines whether the currently set image-pickup mode is a still image-pickup mode or a motion image-pickup mode.

The setter 163 is used to set focus preset information in the memory 166. The focus preset information contains a position of the focus lens 152 to be focused for an object distance. By storing the focus preset information in the memory 166, the focus lens 152 can be reset to the stored position by the reset action (focus preset function) even when the focus lens is then moved.

The memory 166 stores focus preset information, information and a program necessary for the control method, which will be described later, and various types of information. Information necessary for the focus preset contains a first speed at which the focus lens 152 is moved to a preset position in the still image-pickup mode, a second speed or a third speed at which the focus lens 152 is moved to a preset position in the motion image-pickup mode.

Figure 2:
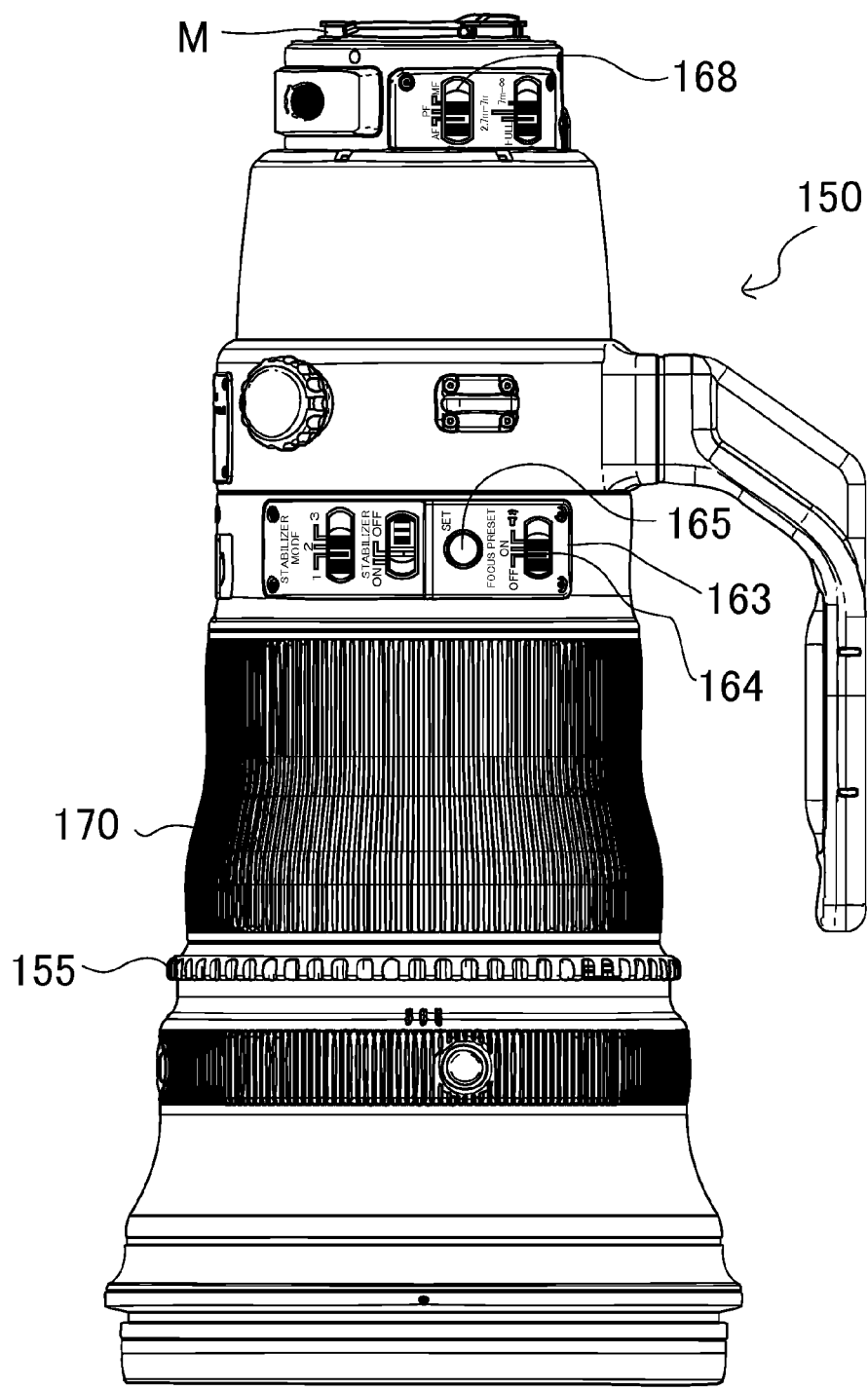
FIG. 2 is a side view of one example of the lens barrel illustrated in FIG. 1.

FIG. 2 is a side view of an illustrative structure of the lens body 150. The lens barrel 150 is attached to the camera body 100 via the mount M illustrated in FIG. 2. The lens barrel 150 illustrated in FIG. 2 includes a focus ring 170, a setter 163, and a focus mode switch 168, and the focus ring 170 enables a manual focus and includes the driver 153.

The setter 163 is configured as a switch panel that includes a focus preset switch 164 and a set button 165. The focus preset switch 164 switches turning on and turning off of the focus preset function, and has a buzzer mode that generates a buzzer sound at the preset time and when the movement is completed. The set button 165 includes a push switch, and when it is pressed when the focus preset switch 164 is turned on or in the buzzer mode, a current focus position (focus lens position) is stored in the memory 166. Thereby, the focus preset information is stored in the memory 166.

The focus mode switch 168 switches the mode of the focus lens 152 to the autofocus (AF) mode, a power focus (PF) mode so as to provide focus driving by controlling the driver 153 in accordance with the operation of the reproduction driving switch 155, and a MF mode by the focus ring 170.

Figure 3:
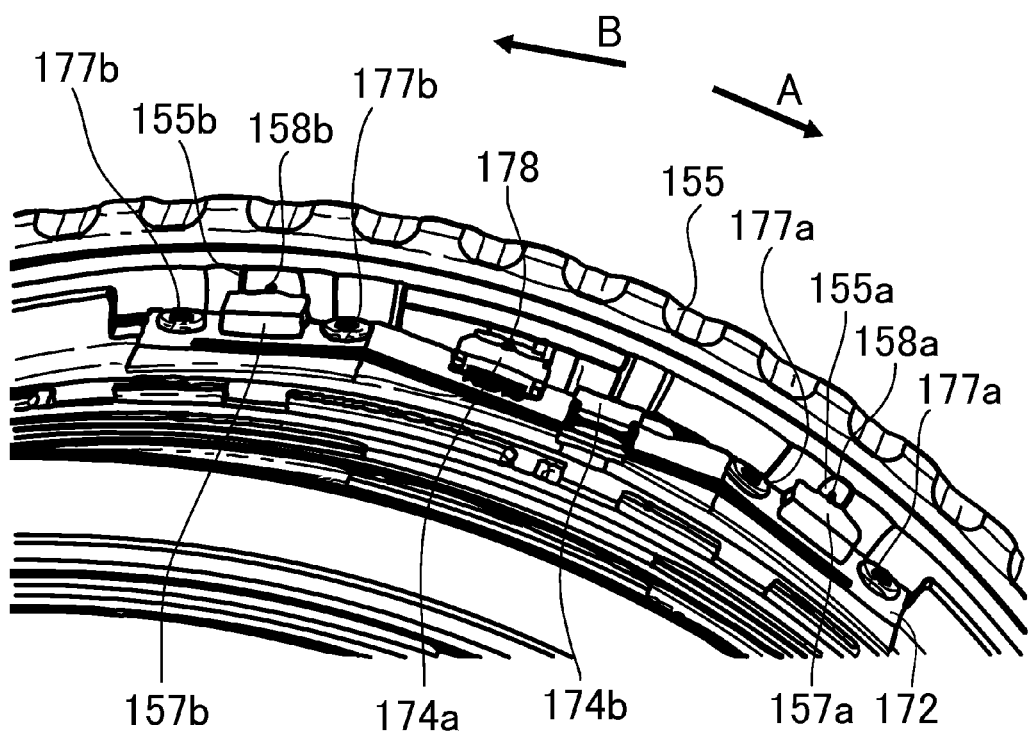
FIG. 3 is a partially enlarged perspective view of the lens barrel illustrated in FIG. 2.

In FIG. 2, the reproduction driving switch 155 is configured as a reproduction ring. FIG. 3 is a partially enlarged perspective view of the lens barrel 150 near the reproduction driving switch 155. The reproduction ring is configured rotatable in A and B directions while a stopper (not illustrated) restricts a rotating angle of the reproduction ring. The reproduction ring is forced to reset to a midpoint position of the rotating angle by an elastic member (not illustrated). FIG. 3 illustrates that the reproduction ring is reset to the midpoint.

When two detecting switches 157a, 157b that serve as the reproduction detector 156 detect a rotation of the reproduction ring, the lens microcomputer 160 moves the focus lens 152 to the preset position. In this embodiment, the lens microcomputer 160 controls a driving speed at which the focus lens 152 is moved to the preset position in accordance with a manipulated amount of the reproduction driving switch 155 detected by the reproduction detector 156 and the image-pickup mode (image-pickup condition).

A flexible printed circuit substrate ("FPC") 172 is attached onto a plane portion of the lens barrel 150 in the circumferential direction. The FPC 172 connects the reproduction detector 156 to the lens microcomputer 160, and a detection result detected by the reproduction detector 156 is sent to the lens microcomputer 160.

The FPC 172 is mounted with two sensing switches 157a, 157b, and two connectors 174a, 174b. The sensing switches 157a, 157b are the same switching devices. When these levers 158a, 158b are fallen to the right or left, different terminals may be connected and one device can obtain two signal outputs.

Grooves 155a, 155b are formed in the internal circumference of the reproduction ring, and the groove 155a is narrower. When the reproduction ring is rotated in the A direction, the wall of the groove 155a contacts the lever 158a of the sensing switch 157a. When the lever 158a is fallen in the A direction, a rotation of the reproduction ring in the A direction is detected. Moreover, when the rotation continues, the wall of the groove 155b contacts the lever 158b of the sensing switch 157b, and the lever 158b falls in the A direction, and a second manipulated amount of the reproduction ring in the A direction is detected.

A rotation in the B direction is similar. When the reproduction ring rotates in the B direction, the wall of the groove 155a contacts the lever 158a of the sensing switch 157a. When the lever 158a falls in the B direction, the rotation of the reproduction ring in the B direction is detected. Moreover, when the rotation continues, the wall of the groove 155b contacts the lever 158b of the sensing switch 157b and the lever 158b falls in the B direction, and a second manipulated amount of the reproduction ring in the B direction is detected. In FIG. 3, reference numerals 177a, 177b denote screws arranged on both sides of the sensing switch, configured to prevent the FPC 172 from peeling off, and used to position of the sensing switch. Reference numeral 178 denotes a relay FPC configured to transmit information of the sensing switches 157a, 157b to the lens microcomputer 160.

As a result, the sensing switch 157a detects a first manipulated amount and direction, the sensing switch 157b detects a second manipulated amount, and the rotation of the reproduction ring can be thus detected by two stages. This configuration provides a control in accordance with a manipulated amount of the reproduction driving switch 155. When the focus mode switch 168 is set to the PF mode, the smooth focus driving can be manipulated in accordance with the manipulated amount of the reproduction driving switch 155.

The detection of the rotating angle of the reproduction ring illustrated in FIG. 3 is mere illustrative. A rotating angle of the reproduction ring may be detected based on a resistance value, and a manipulated amount may be detected at no stages or multiple stages. Alternatively, a manipulated amount may be detected by providing a magnet to the reproduction ring and by detecting the magnetic direction.

Figure 4:
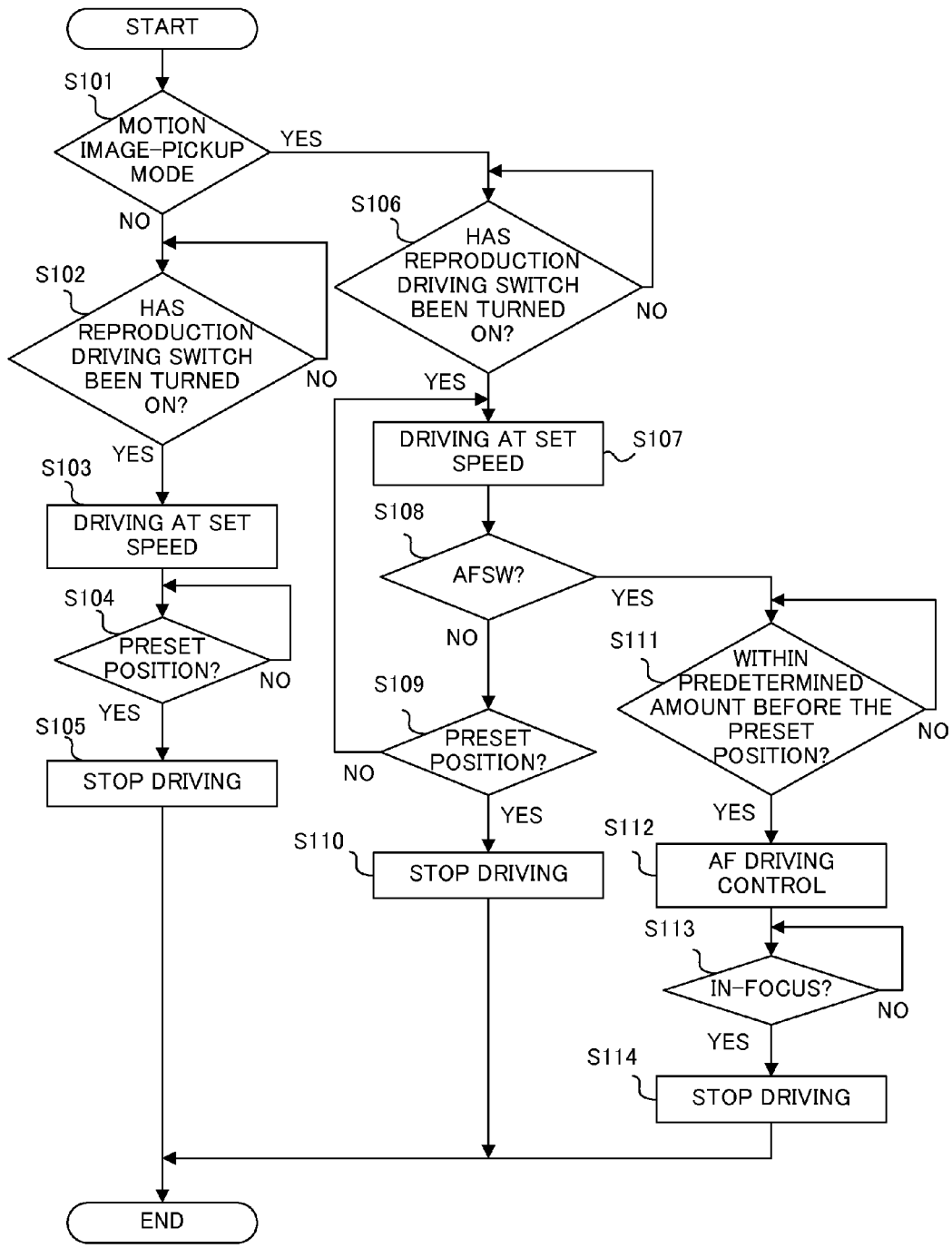
FIG. 4 is a flowchart for explaining an operation of a lens microcomputer illustrated in FIG. 1.

FIG. 4 is a flowchart for explaining a control method of a focus preset function according to this embodiment, and "S" stands for the step. The control method illustrated in FIG. 4 is implemented as a program executed by a computer and is executed by the lens microcomputer 160. In the image-pickup apparatus in which the lens barrel 150 is integrated with the camera body 100, the operation illustrated in FIG. 4 is performed by the camera microcomputer 130 and the setter 128 serves as the setter 163, and the memory 140 serves as the memory 166.

Initially, the image-pickup mode detector 161 in the lens microcomputer 160 communicates with the camera microcomputer 130 and detects an image-pickup mode in the camera body 100 set by the setter 128 (S101).

When the image-pickup mode detector 161 determines that the still image-pickup mode has been set (No of S101), the lens microcomputer 160 obtains information of the manipulation and the manipulated amount of the reproduction driving switch 155 from the reproduction detector 156 (S102).

When the lens microcomputer 160 detects the operation of the sensing switch 157a (Yes of S102), the lens microcomputer 160 drives the focus lens 152 to the preset position at a first speed using the driver 153 (S103). The first speed at this time is a maximum speed of the focus lens 152 drivable by the driver 153.

Next, the lens microcomputer 160 determines based on the position detector 154 whether the focus lens 152 has reached the preset position (S104). When it is moved to the preset position (Yes of S104), the lens microcomputer 160 sends a stop signal to the camera microcomputer 130 (S105), and the camera body 100 can inform the fact to the user.

As a result, the focus lens 152 can follow, for example, even the moving object, and can be driven quickly like a focus lock to the preset position for photography. At the driving stop time, the focus lens is decelerated a predetermined amount before the preset position so that the focus lens can be precisely positioned at the preset position.

On the other hand, when the image-pickup mode detector 161 determines that the motion image-pickup mode has been set (Yes of S101), the lens microcomputer 160 obtains information of the manipulation and the manipulated amount of the reproduction driving switch 155 from the reproduction detector 156 (S106).

When the lens microcomputer 160 detects the operations of the sensing switches 157a, 157b, the lens microcomputer 160 drives the focus les 152 to the preset position at a speed lower than the first speed. (S107). As a result, the focus can be smoothly changed at a stable speed in the motion image pickup. Conventionally, the focus preset function itself is prohibited at the motion image-pickup time, but this embodiment maintains smoothness of the focus change at the motion image-pickup time and enables a focus change, such as focus-in and focus-out, to be used as an image expression.

At this time, when only the sensing switch 157a is operated, the focus lens 152 is driven at the second speed, whereas when both the sensing switches 157a, 157b are operated, the focus lens 152 is driven at the third speed faster than the second speed.

Hence, when the manipulated amount of the reproduction ring is large or when the moving amount of the focus lens 152 from the current position to the target position is large, the driving speed of the focus lens 152 is set to a higher value. In this embodiment, a moving amount (second amount) of the focus lens 152 when both the sensing switches 157a, 157b are operated is larger than a moving amount (first amount) of the focus lens 152 when the sensing switch 157a is operated and the sensing switch 157b is not operated.

By one example, the second speed may be set to an image-plane driving speed of 5 mm/sec and the third speed may be set to an image-plane driving speed of 10 mm/sec. These speeds may be rewritable in a table stored in the memory 166.

The speed is set based on the image-plane driving speed or based on the focal length in the zoom lens configured to change a focal length. When an extender (lens) is attachable to the lens barrel 150, the focal length depends upon the presence or absence of the attachment and thus the image-plane moving amount changes relative to driving of the focus lens 152. Thus, the driving speed of the focus lens 152 may be changed based on the presence or absence of the attachment. For instance, the lens microcomputer 160 may set a higher driving speed to the focus lens when the focal length is a second value than that when the focal length is a first value larger than second value.

The driving speed of the focus lens 152 may be changed based on the diaphragm aperture value set by the setter 128. Since the focus change becomes less conspicuous in the motion image pickup when the diaphragm is set to a small diaphragm aperture side, the driving speed of the focus lens may be set to a higher value in that case. In this case, the image-pickup mode detector 161 serves as an image-pickup condition acquirer configured to acquire an image-pickup condition, such as an image-pickup mode, a focal length, a presence or absence of an attachment of an extender, and a diaphragm set value.

Once the sensing switch 157a is operated, driving of the focus lens 152 starts. Thus, for driving at the third speed, the reproduction ring may be rotated until it contacts the end and then the reproduction ring may be held at that state. In addition, for driving at the second speed, the sensing switch 157b is turned off when a hand is released after the sensing switch 157b is operated due to the midpoint resetting action, and a transfer to the midpoint position may be made through a state of only the operation of the sensing switch 157a.

Next, the lens microcomputer 160 determines whether the focus mode switch 168 is set to a MF mode, a PF mode, or an AF mode during the reproduction driving, and determines whether the AF start command has been issued by the AF switch S1 (S108). When the focus mode is other than the AF mode or no AF start command is detected in the AF mode (No of S108), the lens microcomputer 160 determines whether the focus lens 152 has reached the preset position (S109). After the focus lens 152 is moved to the preset position, the lens microcomputer 160 sends a stop signal to the camera microcomputer 130. In the driving stop control, the focus lens is decelerated a predetermined amount before the preset position and precisely positioned to the preset position. When the focus lens 152 has not yet reached the preset position during the reproduction driving, the flow returns to S107.

On the other hand, in the AF mode and when the AF starting command has been detected (Yes of S108), the lens microcomputer 160 determines whether the focus lens is located in a range from the position a predetermined amount before the preset position to the preset position (S111). When determining that the focus lens is located in that range (Yes of S111), the lens microcomputer 160 controls the AF driving while maintaining the current speed (S112). When determining that the focus lens is out of the range (No of S111), the lens microcomputer 160 waits until it comes into that range. This configuration can reduce a time period necessary to move the focus lens 152 to the in-focus position.

Next, the lens microcomputer 160 determines whether or not the in-focus has been achieved (S113), and if so (Yes of S113), the lens microcomputer 160 sends a stop signal to the camera microcomputer 130 (S114).

The setter 128 may issue a driving command of starting reproduction driving. The operation detecting method at the setter 128 is similar to the reproduction ring. The live view photography is available in the still image pickup, while an pickup image is being displayed on the display 124 on the back surface at the real-time basis. In this case, a user may wish to take an image while he confirms a focus change. Accordingly, even when the still image pickup is determined in S101, the first speed or the second speed may be made selectable so as to provide a control to the still image pickup using the live view photography which is similar to the control of the motion image-pickup mode. In this case, that setting may be performed by either the setter 128 or 163.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-282538, filed Dec. 20, 2010 which is hereby incorporated by reference herein in its entirety.

What is claimed is:

1. An optical apparatus comprising:
   a focus lens;
   a driver configured to drive the focus lens; and
   a controller configured to preset a position of the focus lens in a memory and to control the driver to move the focus lens to the position preset in the memory,
   wherein the controller controls the driver so that a driving speed at which the focus lens is moved to the position preset in the memory in a still image-pickup mode is higher than that in a motion image-pickup mode,
   wherein the position preset in the memory is a position at which the focus lens has been disposed.

2. The optical apparatus according to claim 1, wherein the driving speed at which the focus lens is moved to the position preset in the memory in the still image-pickup mode is a maximum drivable speed of the focus lens.

3. The optical apparatus according to claim 1, further comprising a unit configured to enable the driving speed in the still image-pickup mode and the driving speed in the motion image-pickup mode to be selected when an image of the object taken by the image-pickup optical system in the still image-pickup mode is displayed on a display on a real-time basis.

4. The optical apparatus according to claim 1, wherein in the motion image-pickup mode, the controller controls the driver so that the driving speed of the focus lens when an operated amount of a driving commander configured to issue a command of driving the focus lens to the position in the memory is a first amount is lower than that when the operated amount is a second amount larger than the first amount.

5. The optical apparatus according to claim 1, wherein the controller controls the driver so that the driving speed of the focus lens when a focal length is a first value is lower than that when the focal length is a second value smaller than the first value.

6. The optical apparatus according to claim 1, wherein the controller controls the driver so that the driving speed of the focus lens when a diaphragm aperture diameter value is a first value is lower than that when the diaphragm aperture value diameter is a second value smaller than the first value.

7. The optical apparatus according to claim 1, further comprising an autofocus starting switch, wherein when autofocus is commanded by the autofocus starting switch while the focus lens is being moved to the position preset in the memory in the motion image-pickup mode, the autofocus is performed by maintaining the driving speed after the focus lens is driven to a position a predetermined amount before the position preset in the memory.

8. The optical apparatus according to claim 1, wherein the optical apparatus is an exchange lens, and wherein the controller obtains a command of driving the focus lens to the position preset in the memory, from an image-pickup apparatus to which the exchange lens is attached.

9. The optical apparatus according to claim 1, further comprising a first operation unit configured to preset the position of the focus lens.

10. The optical apparatus according to claim 1, further comprising a second operation unit configured to move the focus lens to the position.

11. The optical apparatus according to claim 10, wherein the second operation unit includes an operation ring rotatable around the optical axis direction and a detection unit configured to detect a rotational amount of the operation ring in a plurality of steps.

12. The optical apparatus according to claim 11, wherein the controller drives the focus lens at a different speed in accordance with a rotational position of the operation ring detected by the detection unit.

13. The optical apparatus according to claim 1, wherein the controller controls the driver to move the focus lens to the position preset in the memory in a non-autofocus operation.

14. An optical apparatus comprising a controller configured to control a driver to move a focus lens to a preset position, wherein the controller controls the driver so that a driving speed at which the focus lens is moved to the preset position in a motion image-pickup mode is lower than that in a still image-pickup mode,
   wherein the position preset in the memory is a position at which the focus lens has been disposed.

15. An optical apparatus comprising:
   a focus lens;
   a driver configured to drive the focus lens; and
   a controller configured to preset a position of the focus lens in a memory, which is set in accordance with an operation of a setter, and to control the driver, after the focus lens is moved from the position preset in the memory, in accordance with a manipulation of a manipulator so as to move the focus lens to the position preset in the memory,
   wherein the controller controls the driver so that a driving speed at which the focus lens is moved to the position stored in the memory when a mode of taking the object is a still image-pickup mode is higher than that when a mode of taking the object is a motion image-pickup mode.

* * * * *